United States Patent
Bender

(10) Patent No.: US 7,440,183 B2
(45) Date of Patent: Oct. 21, 2008

(54) INDEXABLE MICROSCOPE

(75) Inventor: Claus Bender, Asslar-Werdorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/183,519

(22) Filed: Jul. 18, 2005

(65) Prior Publication Data

US 2006/0012860 A1 Jan. 19, 2006

(30) Foreign Application Priority Data

Jul. 19, 2004 (DE) .................... 10 2004 034 845

(51) Int. Cl.
*G02B 21/00* (2006.01)
*G02B 21/06* (2006.01)
(52) U.S. Cl. .................... 359/381; 359/388; 359/368; 359/384
(58) Field of Classification Search ......... 359/368–390, 359/808–822; 351/200–247
See application file for complete search history.

(56) References Cited

U.S. PATENT DOCUMENTS

| | | | | |
|---|---|---|---|---|
| 2,766,655 A * | 10/1956 | Pinkowski | .................. | 359/370 |
| 3,918,793 A * | 11/1975 | Kraft | ............................ | 359/389 |
| 4,946,265 A * | 8/1990 | Shimizu et al. | ............. | 359/381 |
| 5,128,808 A * | 7/1992 | Dosaka | ....................... | 359/821 |
| 5,506,725 A * | 4/1996 | Koike et al. | .................. | 359/388 |
| 5,576,897 A * | 11/1996 | Kuo | ........................... | 359/822 |
| 5,633,752 A | 5/1997 | Tsuchiya et al. | ............ | 359/390 |
| 5,703,715 A * | 12/1997 | Gaul | .......................... | 359/392 |
| 6,400,501 B2 * | 6/2002 | Tsuchiya et al. | ............ | 359/380 |
| 6,853,481 B1 * | 2/2005 | Sukekawa | .................... | 359/368 |
| 2002/0097486 A1 * | 7/2002 | Yamaguchi et al. | ......... | 359/380 |
| 2003/0030898 A1 * | 2/2003 | Roeth et al. | ................. | 359/385 |
| 2004/0145803 A1 | 7/2004 | Eisenkramer | ............... | 359/359 |

FOREIGN PATENT DOCUMENTS

| | | |
|---|---|---|
| DE | 8530473 U1 | 2/1987 |
| DE | 19924686 A1 | 11/2000 |
| DE | 10119909 A1 | 10/2002 |

\* cited by examiner

*Primary Examiner*—Thong Nguyen
(74) *Attorney, Agent, or Firm*—Simpson & Simpson, PLLC

(57) ABSTRACT

An indexable microscope is described, that comprises a microscope stand and an optical beam path, having a plurality of optical components that are switchable into and out of the beam path, which are arranged on at least two independent mechanical assemblies to be indexed separately and are switchable selectably into and out of the beam path by indexing the respective assembly. According to the present invention, a space-saving and flexible arrangement of the separately indexable assemblies having the optical components is achieved in that a common central receiving plate is provided, on the upper side and the lower side of which at least one of the assemblies is respectively arranged. Configuration of the assemblies as rotary disks permits very flexible arrangements which allow both manual and motorized actuation of the indexing of the assemblies.

31 Claims, 5 Drawing Sheets

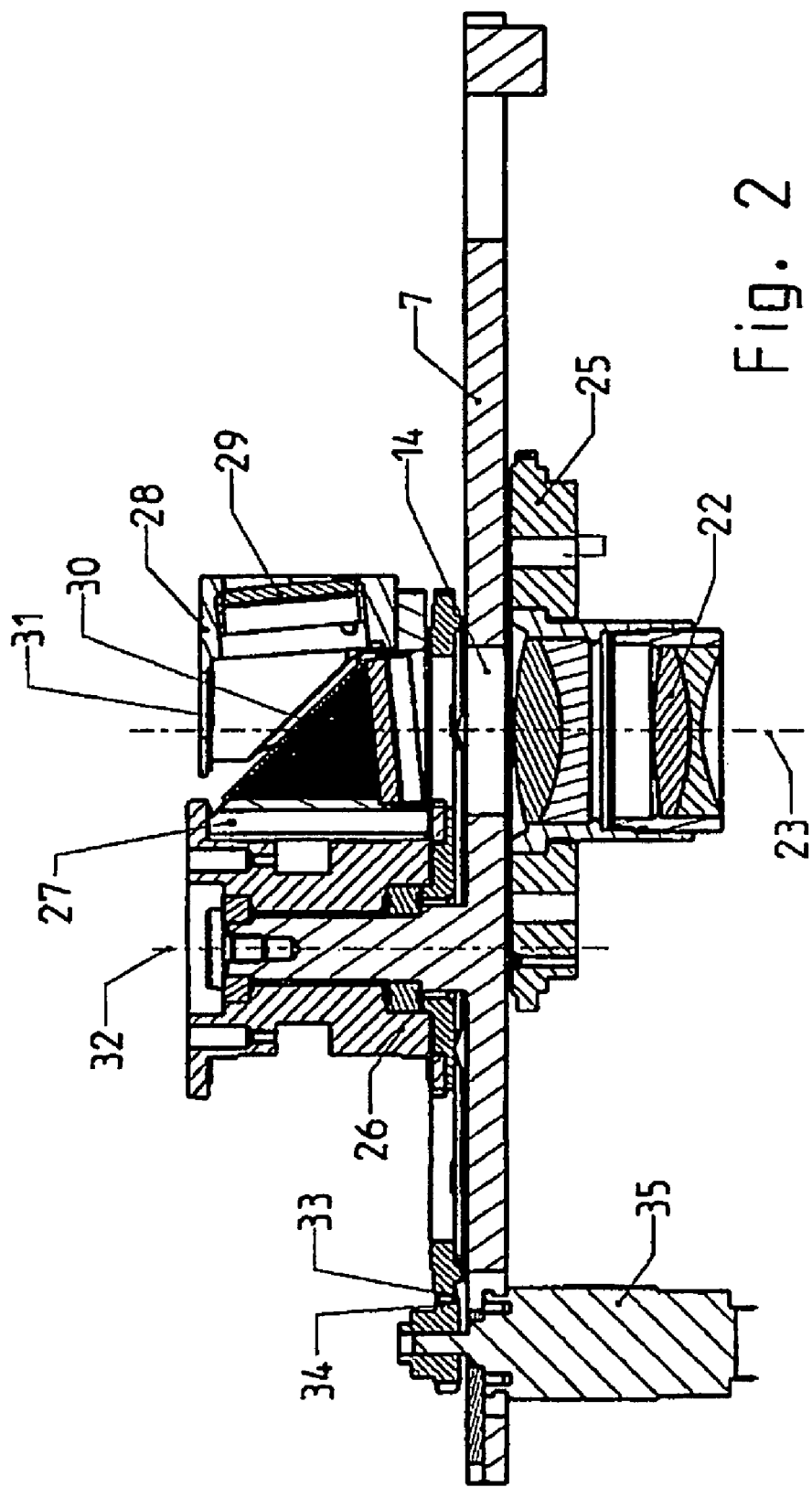

INDEXABLE MICROSCOPE

CROSS REFERENCE TO RELATED APPLICATIONS

This application claims priority of the German patent application 10 2004 034 845.6-42 which is incorporated by reference herein.

FIELD OF THE INVENTION

The invention concerns an indexable microscope comprising a microscope stand and an optical beam path, having a plurality of optical components that are switchable into and out of the beam path, which are arranged on at least two independent mechanical assemblies to be indexed separately and are switchable selectably into and out of the beam path by indexing the respective assembly.

BACKGROUND OF THE INVENTION

Indexable microscopes, which comprise several optical components that can be switched into and out of the beam path, are known from a variety of microscopy application sectors. U.S. Pat. No. 5,633,752, for example, describes an incident-light fluorescence microscope having a special indexing apparatus for the fluorescence device. This microscope encompasses a disk-shaped base which is secured in the microscope housing and on which three rotary disks, mounted in coaxially rotatable fashion, are arranged one above another. Several absorption filters are arranged in different index positions on the first rotary disk, a corresponding number of excitation filters are arranged on the second rotary disk, and dichroic mirrors corresponding to the index positions are arranged on the third rotary disk. A respectively switched-in combination of absorption filter, excitation filter, and dichroic mirror constitutes a fluorescence device, which are usually combined into a fluorescence block. The resulting total height for the overall assemblage together with the baseplate is made up of the height of a usual fluorescence block plus, in addition, the thickness of the two rotary disks arranged thereabove. Because the baseplate at the same time is in contact at the bottom against the housing, the indexing apparatus cannot be supplemented with further elements.

German Unexamined Application DE 101 19 909 A1 also describes an indexable microscope having multiple indexable assemblies. Arranged on this are optical components that can be selectably inserted into the beam path. Various beam splitters or various tube lenses, for example, are arranged, as selectably insertable optical components, on the indexable assemblies. Because of the physical arrangement of the mechanical assemblies that are to be indexed separately, a considerable volume must be provided for installation of those assemblies in the microscope stand.

SUMMARY OF THE INVENTION

It is therefore the object of the present invention to describe a space-saving and flexible arrangement of separately indexable assemblies having optical components.

The mechanical assemblies comprise receptacles for several optical components, and can be embodied either as a sliding member or as a rotary disk. Rotary disks prove particularly advantageous in this context, since they can receive a greater number of optical components in a very small space. Rotary disks of different sizes, having parallel rotation axes offset with respect to one another, can be arranged on the upper side and the lower side of the central receiving plate. In such an arrangement, the respective upper and lower rotary disks can have different numbers of receptacles for the optical components. By indexing the assemblies from one position into the next, one of the optical components on the respective assembly can be selectably inserted into the beam path. The indexing can be accomplished, for example, by direct manual action, by the fact that the assembly is arranged in the microscope in externally accessible fashion. It proves advantageous, however, if respective actuation means, with which the assemblies can be indexed independently of one another, are associated with the assemblies. These actuation means can be embodied, for example, as friction wheels or toothed racks that are actuated manually by the user in order to achieve an indexing of the respective assemblies. Preferably, however, the actuation means are embodied as motorized drive systems that are electrically actuated. The actuation means for manual indexing, or the electric motors, are arranged either on the receiving plate or directly on the assemblies.

In an advantageous embodiment of the microscope, the optical components on the receptacles are aligned on the assemblies, and the assemblies on the central receiving plate, in such a way that upon indexing of the assemblies, the optical components are inserted into the beam path in precisely optically aligned fashion.

In a particularly advantageous embodiment of the microscope, the central receiving plate is equipped with high-precision stop surfaces. The microscope stand has corresponding high-precision countermembers for these stop surfaces. Upon installation of the central receiving plate into the microscope stand, the stop surfaces of the receiving plate are pushed against the countermembers of the microscope stand. As a result, all the assemblies arranged on the central receiving plate, and thus simultaneously all the optical components arranged thereon, are precisely mechanically and optically aligned in a single working step. Mounting of the central receiving plate can then be accomplished, for example, by the fact that it comprises mounting holes through which it is bolted onto the stand.

BRIEF DESCRIPTION OF THE DRAWINGS

The invention will be explained in more detail below with reference to examples and to the schematic drawings, in which:

FIG. 2 is a side view of a central receiving plate having one assembly indexable in motorized fashion, and one indexable manually;

DETAILED DESCRIPTION OF THE INVENTION

Figure 1A:
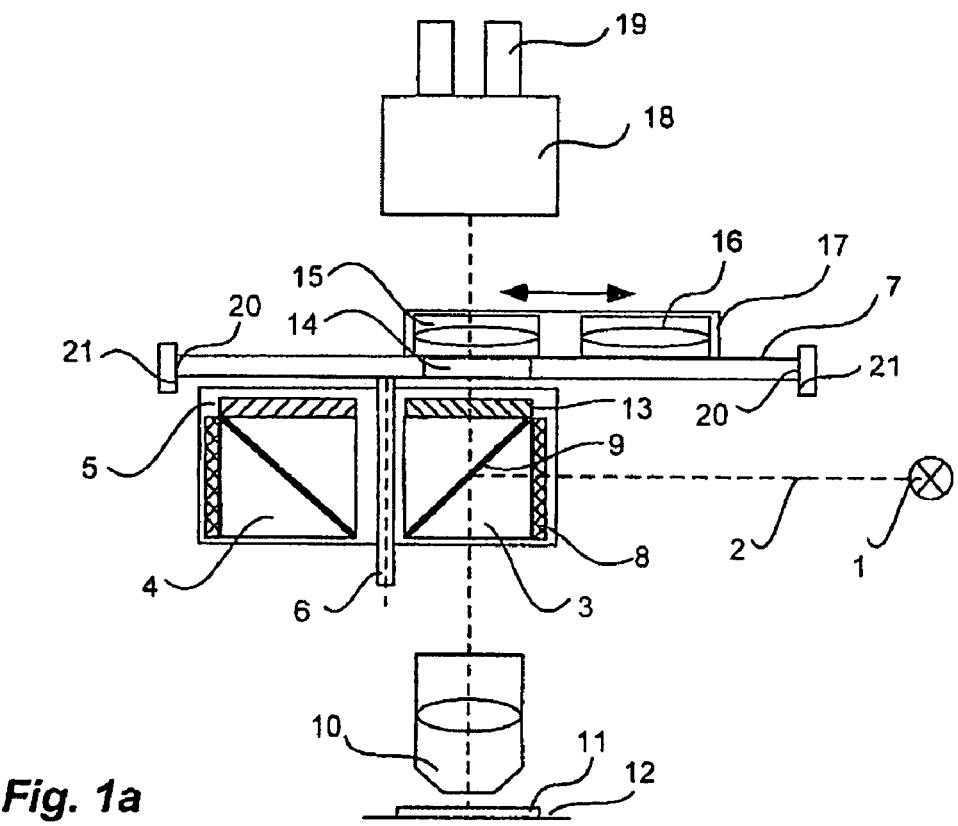
FIG. 1a schematically shows the configuration of an indexable microscope in the form of an upright fluorescence microscope.

FIG. 1a schematically shows the configuration of an upright fluorescence microscope. An illumination beam path 2 proceeds from a light source 1 and strikes a fluorescence cube 3 arranged in the beam path of the microscope. This cube is arranged, along with a further fluorescence cube 4, on a rotatable fluorescence assembly 5. The latter is mounted rotatably about a rotation shaft 6. This rotation shaft 6 is arranged fixedly on the lower side of a central receiving plate 7. By rotation of fluorescence assembly 5 about rotation shaft 6, one of fluorescence cubes 3 or 4 can be pivoted into the beam path of the microscope. In the present depiction, fluorescence assembly 5 comprises only two fluorescence cubes. Fluorescence assembly 5 can, however, be configured as a larger rotary disk so that it can accommodate substantially more fluorescence cubes. A quantity of up to eight fluorescence cubes has, for example, proven feasible in this context.

Illumination beam path 2 proceeding from light source 1 first passes through excitation filter 8 of fluorescence cube 3 and is then deflected by beam splitter 9 toward objective 10. The light of illumination beam path 2 is imaged by objective 10 onto a specimen 11 that is resting on a microscope stage 12. There the light is reflected from specimen 11, traverses objective 10 again, passes through beam splitter 9, and then travels through fluorescence barrier filter 13. The light travels through opening 14 in central receiving plate 7 and then passes through tube lens 15, which together with a second tube lens 16 is arranged above central receiving plate 7 in a displaceable assembly. This assembly, arranged on the upper side of central receiving plate 7, is configured as a tube lens slider 17. By displacement of tube lens slider 17, either first tube lens 15 or second tube lens 16 can selectably be introduced into the beam path. The sliding motion of tube lens slider 17 is depicted in the Figure by a double arrow. After first tube lens 15, the light reaches tube 18. The image of specimen 11 can be viewed by a user of the microscope through eyepieces 19.

Tube lenses 15 and 16 are arranged on the tube lens slider so that after the displacement of tube lens slider 17, they are each aligned in optically exact fashion in the predefined positions in the beam path of the microscope. Fluorescence cubes 3 and 4 are likewise prealigned on the rotatable fluorescence assembly 5 so exactly that after fluorescence assembly 5 is pivoted into predefined positions, fluorescence cubes 3 and 4 are respectively aligned exactly in the beam path of the microscope. This alignment is guaranteed by the fact that the rotatable fluorescence assembly 5 is arranged on the lower side of central receiving plate 7, and the displaceable tube lens assembly (in the form of tube lens slider 17) on the upper side of central receiving plate 7, in precisely aligned fashion. In order to ensure optimal installation of central receiving plate 7 with the assemblies located thereon, central receiving plate 7 comprises several high-precision stop surfaces 20. Embodied on the microscope stand (not depicted) are high-precision countermembers 21 against which stop surfaces 20 of central receiving plate 7 are pushed upon installation of central receiving plate 7. Contact of stop surfaces 20 against countermembers 21 thus ensures that simultaneously, in a single working step, all the assemblies and therefore all the optical components arranged thereon—i.e. in this case tube lenses 15 and 16 as well as fluorescence cubes 3 and 4—are precisely mechanically and optically aligned. This is advantageous both during manufacture and in the event of a service operation.

Figure 1B:
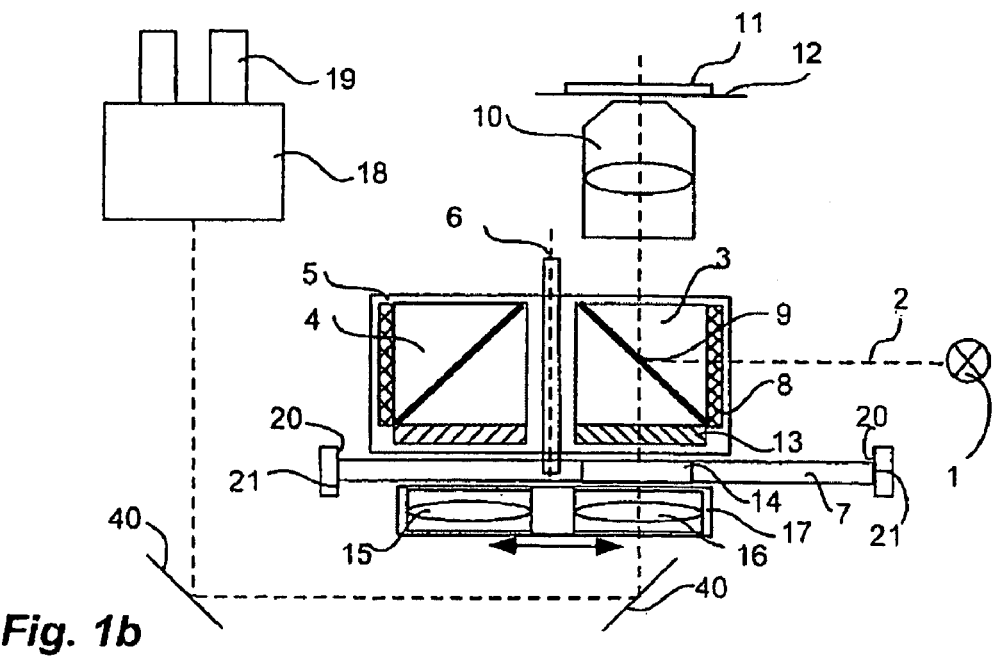
FIG. 1b schematically shows the configuration of an indexable microscope in the form of an inverted fluorescence microscope.

The present invention has been depicted with reference to FIG. 1a using the example of an upright fluorescence microscope. It is clear to one skilled in the art that the invention can also be integrated, in entirely analogous fashion, into an inverted microscope. Such an inverted microscope is shown in FIG. 1b. It comprises substantially the same components as in FIG. 1a, with the addition only of two beam deflection means 40. Identical components are always identified with the same reference numbers. For example, here a fluorescence assembly 5 is arranged on the upper side of the common central receiving plate 7, and the displaceable tube lens assembly (in the form of a tube lens slider 17) on the lower side of central receiving plate 7.

The optical components on the assemblies to be indexed can be very different depending on the application. For example, in addition to the fluorescence cubes and tube lenses and tube-lens systems already described, color filters, modulators such as Hoffmann modulators, side ports out of the beam path, broad-band protection filters for the infrared or ultraviolet radiation region, light stops ("shutters"), mirror scanners, etc., can be arranged on the indexable assemblies. It is even conceivable in this context for optical components of completely different functionality to be arranged on one indexable assembly. Because the assembly or assemblies on the upper side and on the lower side of the common central receiving plate are switchable independently of one another, it is thereby possible to introduce into the beam path any desired combinations of optical components that the user may consider necessary for a particular application.

Because of the arrangement of the indexable assemblies on the upper side and lower side of the central receiving plate, there is no absolute necessity to select assemblies, e.g. rotary disks, having the same size and the same number of optical components. Instead, the combination of the upper and lower assembly can be selected entirely without restriction. For example, an indexable assembly arranged on the upper side of the central receiving plate can have eight receptacles for eight optical components, one of which is to be introduced respectively into the beam path of the microscope. The assembly that is arranged on the lower side of the central receiving plate can have, for example, only two or three receptacles for two or three optical components, respectively. If one position on the assemblies is left unoccupied or cannot be occupied, this then serves as an open passage with no optical component. Two additional examples of possible configurations will be described with reference to the Figures described below.

FIG. 2 is a sectioned view of a central receiving plate 7 having an opening 14. The exact arrangement is evident from FIG. 3, which is a view from above of central receiving plate 7 with the assemblies of FIG. 2 located on it. The line labeled AB in FIG. 3 indicates the section line shown in the sectioned view of FIG. 2.

Figure 3:
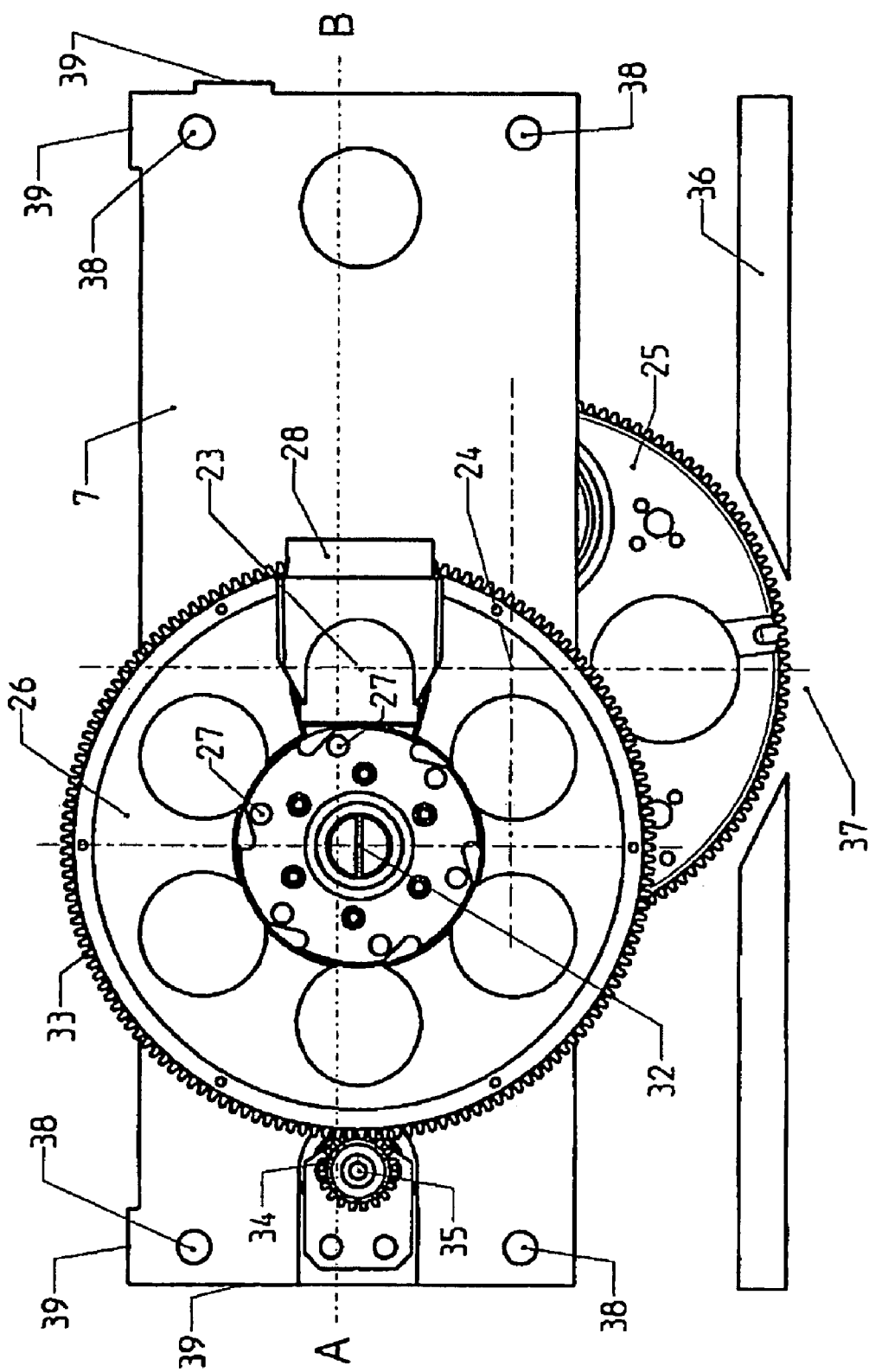
FIG. 3 is a plan view of the central receiving plate of FIG. 2.

Arranged on the lower side of central receiving plate 7 is a rotatable tube lens assembly 25 embodied as a rotary disk. A tube lens 22, here clearly recognizable as an entire lens system, is pivoted into the beam path of the microscope (not depicted here). The beam path is represented schematically by an optical axis 23. In this view, rotation axis 24 of rotatable tube lens assembly 25 aligns with optical axis 23 and is located, in this depiction, in front of the section plane. The arrangement of optical axis 23 and rotation axis 24 of rotatable tube lens assembly 25 is evident from FIG. 3. In FIG. 3, tube lens 22 is concealed by central receiving plate 7.

In this position pivoted into the beam path, tube lens 22 is aligned on optical axis 23 and is arranged directly beneath an opening 14 in central receiving plate 7. As is apparent from both FIG. 2 and FIG. 3, in the example depicted here, in order to make the drawing clearer, no further tube lenses are arranged on rotatable tube lens assembly 25. Arranged on the upper side of central receiving plate 7 is a rotatable fluorescence assembly 26 embodied as a rotatable disk. It comprises several receptacles 27 onto which fluorescence cubes can be mounted. For example, a fluorescence cube 28 having an excitation filter 29, a beam splitter 30, and a barrier filter 31 is mounted on receptacle 27 depicted to the right in FIG. 2.

Fluorescence assembly 26 is mounted rotatably about a rotation axis 32. As is apparent from FIG. 3, fluorescence assembly 26 comprises six receptacles 27 for fluorescence cubes. As depicted here, fluorescence assembly 26 is rotated into a position such that fluorescence cube 28 is arranged in the beam path of the microscope, i.e. centered on the optical axis. Fluorescence cube 28, as well as unoccupied opening 14 of central receiving plate and tube lens 22, are thus arranged one above another and positioned on optical axis 23.

Rotation axis 32 of fluorescence assembly 26 is located on center line AB of central receiving plate 7. Arranged at the edge of the rotary disk of fluorescence assembly 26 is a ring gear 33 into which pinion 34 on the shaft of motor 35 engages. Fluorescence assembly 26 can thus be shifted into any desired positions by appropriate electrical activation of motor 35, so that the fluorescence cubes mounted on receptacles 27 can be arranged centeredly on optical axis 23.

Rotation axis 24 of tube lens assembly 25 is arranged at a distance from center line AB of central receiving plate 7. The edge of the rotary disk of tube lens assembly 25 thus protrudes for some distance beneath central receiving plate 7. Microscope housing 36 has a housing opening 37 through which a microscope user can reach the edge of the rotary disk of tube lens assembly with his or her hand, and thereby bring about manual displacement of tube lens assembly 25.

In FIG. 3, central receiving plate 7 comprises mounting holes 38 with which it can be bolted onto the microscope stand (not depicted). To allow exact alignment and positioning of central receiving plate 7 and thus of the optical components in the beam path of the microscope, central receiving plate 7 comprises stop surfaces 39 machined with high precision which are pushed against countermembers (not depicted here) on the microscope stand, as already explained with reference to FIG. 1a.

Figure 4:
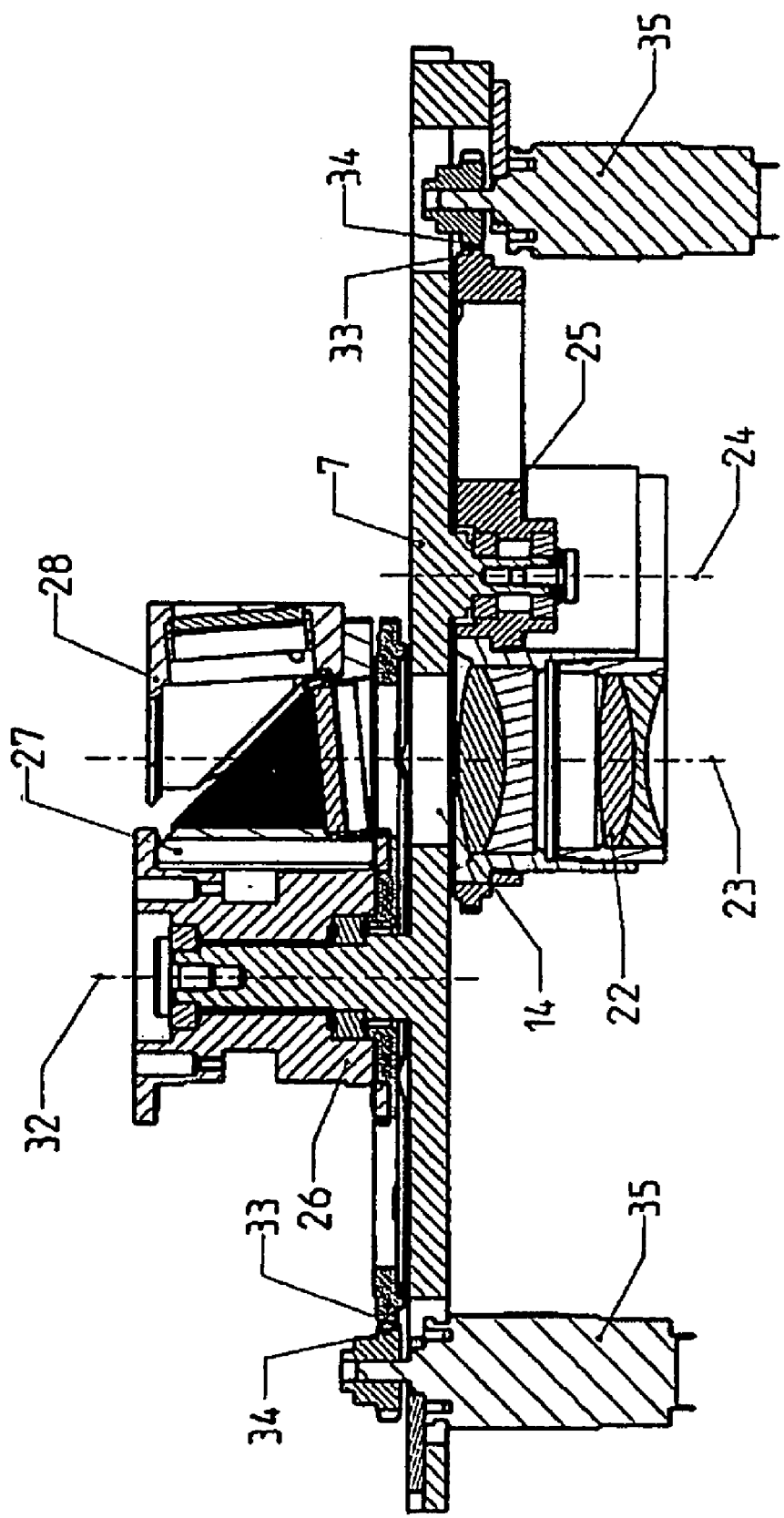
FIG. 4 is a side view of a central receiving plate having two assemblies that are indexable in motorized fashion.
Figure 5:
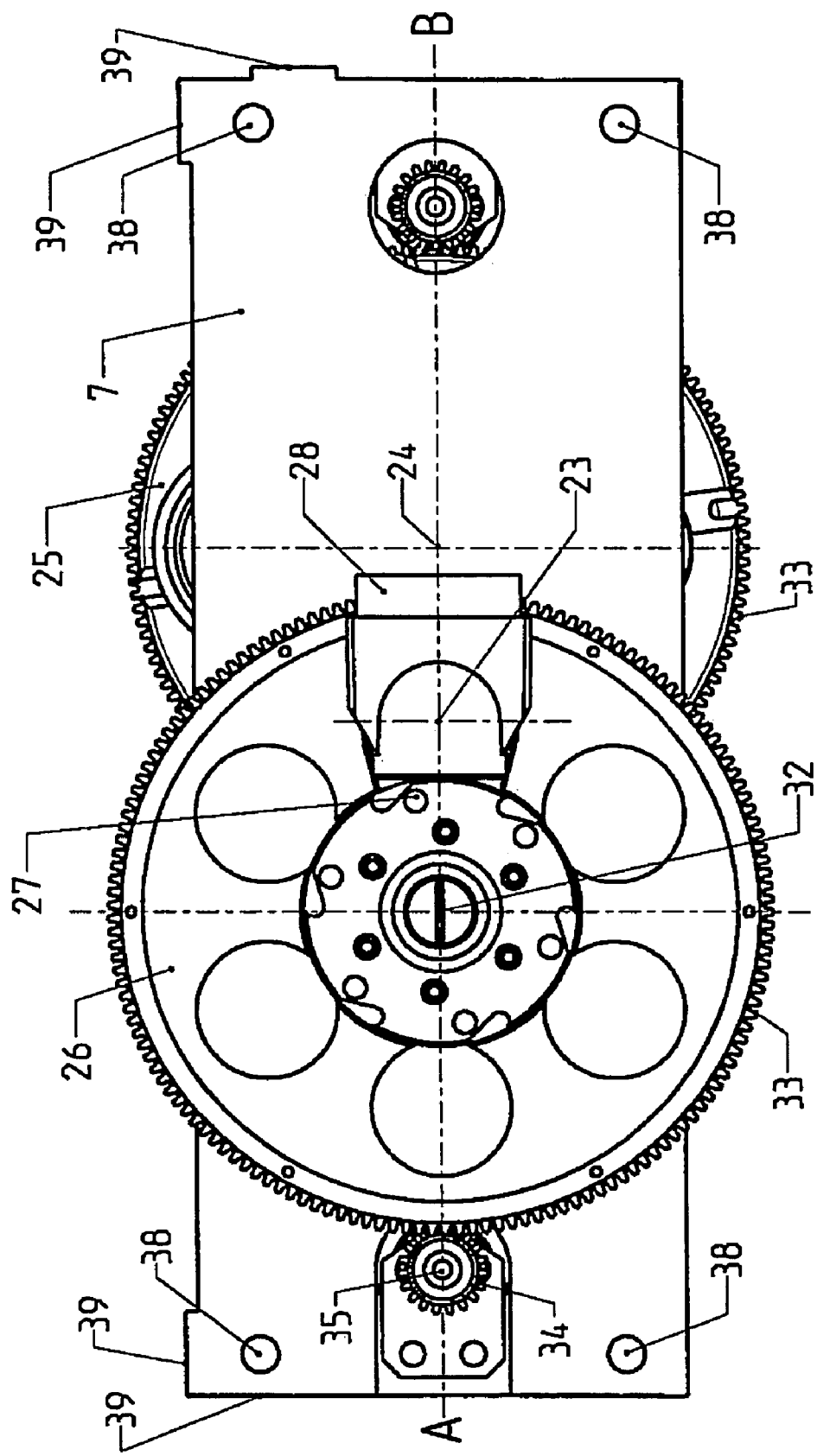
FIG. 5 is a plan view of the central receiving plate of FIG. 4.

FIGS. 4 and 5 show a further exemplifying embodiment of the present invention in which all the assemblies are operated in motorized fashion, as will be explained below. Arranged on a central receiving plate 7 having an opening 14 are, on its lower side, a tube lens assembly 25 embodied as a rotary disk and, on its upper side, a fluorescence assembly 26 embodied as a rotary disk. Tube lens assembly 25 is mounted rotatably about a rotation axis 24. Fluorescence assembly 26 is likewise mounted rotatably about a rotation axis 32. Fluorescence assembly 26 is pivoted into a position such that a fluorescence cube 28 attached to its receptacle 27 is arranged in aligned fashion in the region of optical axis 23. Optical axis 23 proceeds centrally through opening 14 of central receiving plate 7. Tube lens assembly 25 is rotated into a position such that a tube 22 is likewise aligned on optical axis 23.

Rotation axis 24 of tube lens assembly 25 and rotation axis 32 of fluorescence assembly 26 are located, together with optical axis 23, on center line AB of central receiving plate 7. A very compact configuration for the entire unit comprising central receiving plate 7, tube lens assembly 25, and fluorescence assembly 26 is thereby achieved. This refers both to the width of the entire arrangement in plan view as shown in FIG. 5, and to the height of the assemblage as shown in FIG. 4. Tube lens assembly 25 and fluorescence assembly 26 are displaced in motorized fashion. For that purpose, the rotary disks of tube lens assembly 25 and of fluorescence assembly 26 each have a ring gear 33 at their outer edge. Associated with both tube lens assembly 25 and fluorescence assembly 26 is a respective motor 35 on whose shaft is mounted a pinion 34 that engages into the respective ring gear 33 of the associated assembly. As a result of the rotation of pinion 34 on the motor, both tube lens assembly 25 and fluorescence assembly 26 can thus be rotated into the desired position. The arrangement of displaceable assemblies on the upper side and the lower side of a central receiving plate 7 thus allows a very compact configuration to be achieved, requiring little installation space even when the assemblies are driven in completely motorized fashion.

In FIG. 5 as well, mounting holes 38 are provided on central receiving plate 7 and allow it to be bolted to the microscope stand (not depicted). To allow exact alignment and positioning of central receiving plate 7 and thus of the optical components in the beam path of the microscope, high-precision stop surfaces 39 are provided on central receiving plate 7 and are pushed against countermembers (not depicted here) on the microscope stand, as already explained with reference to FIG. 1a.

| PARTS LIST | |
|---|---|
| 1 | Light source |
| 2 | Illumination beam path |
| 3 | First fluorescence cube |
| 4 | Second fluorescence cube |
| 5 | Rotatable fluorescence assembly |
| 6 | Rotation axis |
| 7 | Central receiving plate |
| 8 | Excitation filter |
| 9 | Beam splitter |
| 10 | Objective |
| 11 | Specimen |
| 12 | Microscope stage |
| 13 | Fluorescence barrier filter |
| 14 | Opening |
| 15 | First tube lens |
| 16 | Second tube lens |
| 17 | Tube lens slider |
| 18 | Tube |
| 19 | Eyepieces |
| 20 | Stop surfaces |
| 21 | Countermembers |
| 22 | Tube lens |
| 23 | Optical axis |
| 24 | Rotation axis of 25 |
| 25 | Tube lens assembly |
| 26 | Fluorescence assembly |
| 27 | Receptacles |
| 28 | Fluorescence cube |
| 29 | Excitation filter |
| 30 | Beam splitter |
| 31 | Barrier filter |
| 32 | Rotation axis of 26 |
| 33 | Ring gear |
| 34 | Pinion |
| 35 | Motor |
| 36 | Microscope housing |
| 37 | Housing opening |
| 38 | Mounting holes |
| 39 | Stop surfaces |
| 40 | Beam deflection means |

What is claimed is:

1. An indexable microscope comprising:
   an optical beam path;
   an objective;
   a common central receiving plate having an upper side and a lower side and positioned within a microscope housing; and,
   a plurality of optical components, the plurality of optical components separate and different from the objective, that are switchable into and out of the beam path, wherein the plurality of optical components are arranged on at least two independent mechanical assemblies to be indexed separately and are switchable selectably into and out of the beam path by indexing the respective assembly and wherein a first mechanical assembly from the at least two independent mechanical assemblies is connected to the upper side and a second mechanical assembly from the at least two independent mechanical assemblies is connected to the lower side, wherein one of the first mechanical assembly and the second mechanical assembly is disposed between the receiving plate and the objective in the beam path, wherein the objective is disposed in a location different than respective locations for the at least two independent mechanical assemblies, and wherein the receiving plate is rotationally fixed.

2. The microscope as defined in claim 1, wherein one of the assemblies is indexable manually by direct engagement.

3. The microscope as defined in claim 2, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

4. The microscope as defined in claim 1, wherein the assemblies each have associated with them actuation means with which the assemblies are indexable independently of one another.

5. The microscope as defined in claim 4, wherein indexing of one of the assemblies by means of the actuation means is accomplished manually.

6. The microscope claim 5, wherein the actuation means are arranged on the receiving plate or on the assemblies.

7. The microscope as defined in claim 6, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

8. The microscope as defined in claim 5, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

9. The microscope as defined in claim 4, wherein the actuation means are embodied as motorized drive systems.

10. The microscope as defined claim 9, wherein the actuation means are arranged on the receiving plate or on the assemblies.

11. The microscope as defined in claim 10, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

12. The microscope as defined in claim 9, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

13. The microscope as defined claim 4, wherein the actuation means are arranged on the receiving plate or on the assemblies.

14. The microscope as defined in claim 13, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

15. The microscope as defined in claim 4, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

16. The microscope as defined in claim 1, wherein the assemblies are embodied as sliding members, and comprise receptacles for mounting the optical components.

17. The microscope as defined in claim 16, wherein the optical components on the receptacles are aligned on the assemblies, and the assemblies are aligned on the central receiving plate, in such a way that upon indexing of the assemblies, the optical components are inserted into the beam path in precisely optically aligned fashion.

18. The microscope as defined in claim 17, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

19. The microscope as defined in claim 16, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

20. The microscope as defined in claim 1, wherein the assemblies are embodied as rotary disks, and comprise receptacles for mounting the optical components.

21. The microscope as defined in claim 20, wherein the rotary disks have different, parallel rotation axes.

22. The microscope as defined in claim 21, wherein the rotary disks each comprise a different number of receptacles for the optical components.

23. The microscope as defined in claim 22, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

24. The microscope as defined in claim 21, wherein the central receiving plate comprises high-precision stop surfaces and microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

25. The microscope as defined in claim 20, wherein the rotary disks each comprise a different number of receptacles for the optical components.

26. The microscope as defined in claim 25, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

27. The microscope as defined in claim 20, wherein the optical components on the receptacles are aligned on the assemblies, and the assemblies are aligned on the central receiving plate, in such a way that upon indexing of the assemblies, the optical components are inserted into the beam path in precisely optically aligned fashion.

28. The microscope as defined in claim 27, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

29. The microscope as defined in claim 20, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

30. The microscope as defined in claim 1, wherein the central receiving plate comprises high-precision stop surfaces and the microscope comprising corresponding high-precision countermembers, so that upon installation of the central receiving plate into the microscope, as a result of contact of the stop surfaces against the countermembers, all the assemblies and thus all the optical components are simultaneously precisely aligned mechanically and optically.

31. The microscope as defined in claim 1, wherein the central receiving plate comprises mounting holes.

\* \* \* \* \*